United States Patent [19]
Zelenka

[11] Patent Number: 5,583,687
[45] Date of Patent: Dec. 10, 1996

[54] LIGHT BEAM DEFLECTION DEVICE

[75] Inventor: Thomas Zelenka, Moenkeberg, Germany

[73] Assignee: Linotype Hell AG, Kiel, Germany

[21] Appl. No.: 452,412

[22] Filed: May 26, 1995

[30] Foreign Application Priority Data

Jun. 4, 1994 [DE] Germany ............ 44 19 624.5

[51] Int. Cl.[6] .................................... G02B 26/08
[52] U.S. Cl. ..................... 359/226; 359/833; 359/496
[58] Field of Search ...................... 359/223, 225, 359/226, 831, 833, 495, 496, 629, 634, 636, 638

[56] References Cited

U.S. PATENT DOCUMENTS

| | | | |
|---|---|---|---|
| 3,940,609 | 2/1976 | Johnstun | 359/223 |
| 4,560,244 | 12/1985 | Acherman | 359/223 |
| 5,365,049 | 11/1994 | Peng | 235/462 |
| 5,367,399 | 11/1994 | Kramer | 359/206 |
| 5,387,995 | 2/1995 | Harig | 359/204 |

FOREIGN PATENT DOCUMENTS

| | | |
|---|---|---|
| 4014837A1 | 11/1991 | Germany . |
| 4124229A1 | 1/1993 | Germany . |
| 4130977A1 | 3/1993 | Germany . |
| 4304499A1 | 9/1993 | Germany . |

*Primary Examiner*—Timothy P. Callahan
*Assistant Examiner*—Jung Ho Kim
*Attorney, Agent, or Firm*—Hill, Steadman & Simpson

[57] ABSTRACT

A device for deflection of a light beam formed of a light-permeable deflection prism extending in a direction of a rotational axis. The prism has a light entry face, a reflection face proceeding obliquely thereto and a light exit face, and is further formed of a carrier prism joined to the deflection prism at the reflection face. The carrier prism supplements the deflection prism to essentially form a cuboid unit that is seated rotatably around an optical axis that resides perpendicularly relative to the light entry face of the deflection prism. For producing a unit designed rotationally symmetrical relative to the optical axis at least in regions, the optically unused edges and corners of the cuboid unit are rounded. Spherical caps are attached to at least two of the unused outside surfaces of the unit, these spherical caps supplementing the unit to form a spherical outside contour at least in regions.

18 Claims, 3 Drawing Sheets

LIGHT BEAM DEFLECTION DEVICE

BACKGROUND OF THE INVENTION

The invention is in the field of reproduction technology and is directed to a light beam deflection device for an originals scanner device or for a recording device. Such a scanner device usually comprises a light source that generates at least one light beam, a light beam deflection device, and an optical unit.

Given an originals scanner device, also referred to as an input scanner, a light beam generated in a scanner unit is conducted point-by-point and line-by-line across an original to be scanned, and the scan light reflected from the original or that has passed through the original is converted into an image signal in an optoelectronic transducer. Given a recording device, also referred to as a recorder, an exposer, or an output scanner, the light beam acquired in a scanner unit is intensity-modulated by an image signal for the recording of information and is conducted point-by-point and line-by-line across a light-sensitive recording material.

In the case of a flat bed apparatus, the holder for the original or the recording material is a planar surface across which the light beam is conducted point-by-point and line-by-line, and that moves relative to the scanner unit. In the case of an inside-drum device, the holder for the original or for the recording material is designed as a stationary half-shell or trough. The scanner unit moves parallel to the longitudinal axis of the holder and the light beam is conducted radially across the original or recording material perpendicular to the longitudinal axis.

An inside-drum recording device is disclosed, for example, by EP-A-0 354 028. The light beam deflection device therein is designed as a mirrored surface arranged transversely relative to the light propagation direction and is connected to a rotating shaft. The light beam is steered onto a recording material with the assistance of the mirrored surface.

During operation of the recording device, contaminants can collect at the mirrored surface and air turbulence can arise at high speeds due to the asymmetrical design relative to the rotational axis. Such air turbulence leads to noise, causes additional contamination in the region of the reflection face, and deteriorates the uniform rotation of the mirrored surface.

DE-A-41 24 229 already discloses a light beam deflection device having a light entry face and a light exit face for the perpendicularly deflected light beam, this light beam deflection device being comprised of a rotatably seated carrier prism and of a light-permeable deflection prism extending in the direction of a rotational axis. The surface of the deflection prism adjoining the carrier prism is designed as a reflection face that proceeds transversely relative to the rotational axis. The deflection prism is glued to the carrier prism and the two prisms supplement one another in at least certain regions to form a unit that is symmetrical relative to the rotational axis. Disk-shaped cover elements that project beyond the unit in the radial expanse thereof are arranged to the side of the unit.

Given this light beam deflection device, only slight air turbulence, contamination and rough running result due to the cover elements; manufacture, however, is comparatively involved since the cover elements must be exactly manufactured and must be precisely centered at the unit.

DE-A-43 04 499 discloses another light beam deflection device comprising a carrier prism and a deflection prism that are connected by gluing to form a rotatable unit. In this embodiment, the edges and corners of the unit that are not optically used are rounded, so that the unit comprises a spherical outside contour, at least in sections, as a result whereof only slight air turbulence likewise arises.

DE-A-41 30 977 discloses another light beam deflection device that is composed of a transparent body designed as a spherical segment that comprises a light entry face, a reflection face and a light exit face, and is further composed of a carrier member likewise fashioned as a spherical segment that is glued to the reflection layer with the transparent body. The unit formed of the transparent member and the carrier body is rotatable around an axis residing perpendicularly relative to the light entry face, and comprises an outside contour that is rotationally symmetrical at least with reference to the axis. Due to the spherical design of the light beam deflection device, it can rotate with a relatively high speed without creating significant air turbulence and running noise. What is disadvantageous, however, is that the light exit face is curved and that optical errors caused as a result thereof must be corrected in the beam path in an involved way.

Beyond this, the known light beam deflection devices exhibit the disadvantage that the glued connection of deflection prism and carrier prism, or of transparent member and carrier body, only allows a relatively slight mechanical loading, so that the permitted speed of the light beam deflection devices is limited.

SUMMARY OF THE INVENTION

It is an object of the invention to improve upon a light beam deflection unit such that operation at high speed is assured and running noise and contamination are avoided to the greatest extent.

According to the invention, a device is provided for deflection of a light beam and is formed of a light-permeable deflection prism extending in a direction of a rotational axis. The prism has a light entry face, a reflection face preceding obliquely to the light entry face, and a light exit face. A carrier prism is connected to the deflection prism at the reflection face, the carrier prism supplements the deflection prism to form a substantially cuboid unit seated rotatably around an optical axis as said rotational axis residing perpendicular to the light entry face of the deflection prism. Optically unused edges and corners of the unit are rounded. Spherical caps are attached to at least two unused outside surfaces of the unit, the spherical caps supplementing a contour of the unit to form a spherical outside contour at least in regions.

The invention shall be set forth in greater detail below with reference to FIGS. 1–5.

DESCRIPTION OF THE PREFERRED EMBODIMENTS

Figure 1:
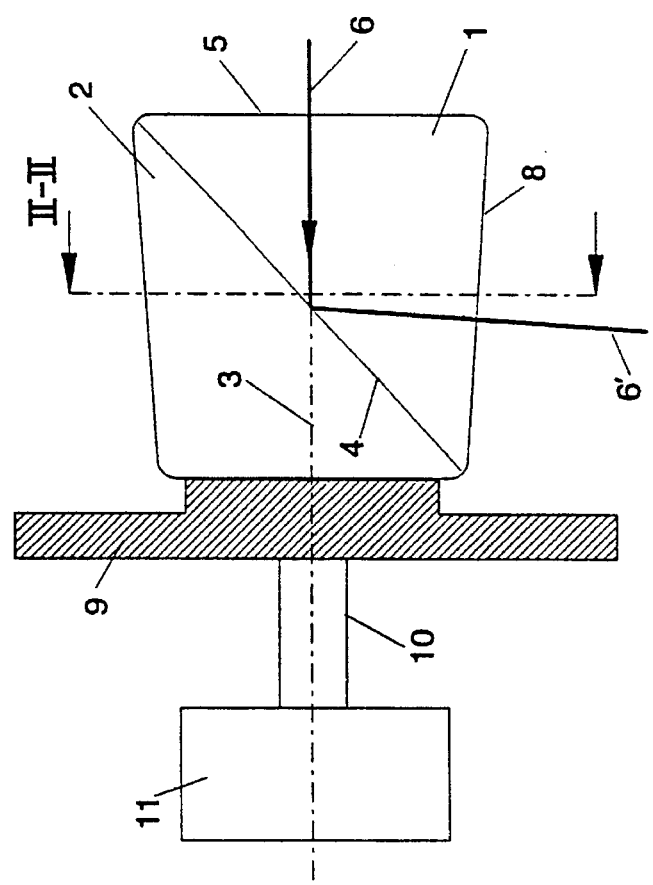
FIG. 1 is a basic exemplary embodiment for a light beam deflection device of the invention shown in section.

FIG. 1 shows in section a basic exemplary embodiment of a light beam deflection device of the invention within a scanner device (not shown in greater detail) for an originals scanner device or a recording device. The light beam deflection unit is essentially composed of a transparent deflection prism 1 and of a carrier prism 2 that supplements the deflection prism 1 to form an essentially cuboid, compact unit 1,2 that is rotationally symmetrical with respect to an optical axis 3. The surfaces of deflection prism 1 and carrier prism 2 that abut one another are connected to one another by gluing. The deflection prism 1 is composed of glass and the carrier prism 2 is composed of a non-transparent material, for example of a metal such as aluminum. Deflection prism I and carrier prism 2 should be fabricated of materials having approximately the same specific weight in order to obtain a symmetrical mass distribution that reduces the dynamic load on the light beam deflection device at high speeds. Given employment of different materials, an identical coefficient of thermal expansion is at least expedient in order to avoid shearing forces in the area of the glued connection.

That surface of the deflection prism 1 adjoining the carrier prism 2 is designed as a reflection face 4, for example in the form of a silver layer, which proceeds at an angle of inclination of approximately 40°–45° relative to the optical axis 3. The deflection prism 1 further comprises a light entry face 5 arranged perpendicularly relative to the optical axis 3 for a light beam 6 that is incident in the direction of the optical axis 3 and a light exit face 8 oriented perpendicularly to the exit direction 7 of the light beam 6 for the light beam 6' reflected at the reflection face 4.

The unit 1, 2 formed of deflection prism 1 and carrier prism 2 has a surface of the carrier prism 2 secured to a disk-shaped receptacle 9, for example by gluing. The receptacle 9 is connected via a shaft 10 to a drive 11 that turns the unit 1,2 around the optical axis.

Given an angle of inclination of the reflection face 4 of 45° relative to the optical axis, the reflected light beam 6' departs the unit 1,2 at a deflection angle of 90° relative to the incident light beam 6. A deflection angle of 90°, however, can lead to disturbing light reflexes that are reflected from the scanning or recording plane back into the deflection device. In order to avoid such light reflexes, it proves advantageous to select a deflection angle that deviates from 90°. As shown in FIG. 1, this is achieved by an inclination of the reflection face 4 deviating from 45° and, under the optical condition that the light exit face 8 must lie perpendicular to the light exit direction 7, by a corresponding inclination of the light exit face 8 relative to the optical axis 3. In order to preserve the rotational symmetry of the unit 1, 2 formed of deflection prism 1 and carrier prism 2, that face of the carrier prism 2 lying opposite the light exit face 8 is likewise correspondingly inclined, so that the shape of the unit 1,2 deviates slightly from a cube or cuboid. A deflection angle deviating from 90° by approximately 1° through 5° suffices in order to avoid such light reflexes.

Figure 2:
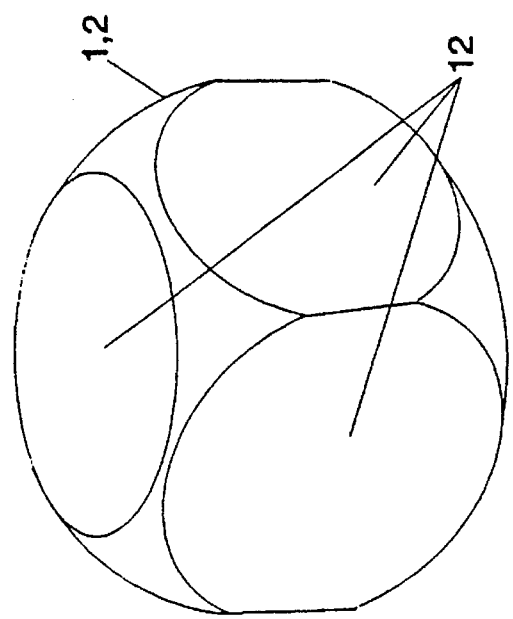
FIG. 2 is a perspective illustration of the device of FIG. 1.

For improving the aerodynamic properties of the light beam deflection device with respect to the creation of air turbulence and running noise, the edges and optically unused corners of the cube or cuboid unit 1, 2 are advantageously rounded and, as may be seen from the perspective view in FIG. 2, the planar outside surfaces 12 of the unit 1,2 assume a nearly circular shape.

A further improvement of the aerodynamic properties of the deflection device is achieved in preferred fashion in that spherical caps 13,14,15 or spherical segments are attached to at least two of the three unused outside surfaces 12 of the unit 1,2, whereby the used outside surfaces are the light entry face 5, the light exit face 8 and that outside surface that is connected to the receptacle 9.

The spherical caps 13,14,15 that, for example, are connected to the unit 1,2 by gluing, lend this unit 1, 2 an essentially spherical outside contour in regions, this allowing high speeds without creating great air turbulence and running noise. As a result thereof, contamination of the light beam deflection unit with suspended particles that are contained in the air flowing into the device can be reduced. The spherical, and thus smooth, outside contour also enables a simple cleaning of the light beam deflection device.

Figure 3:
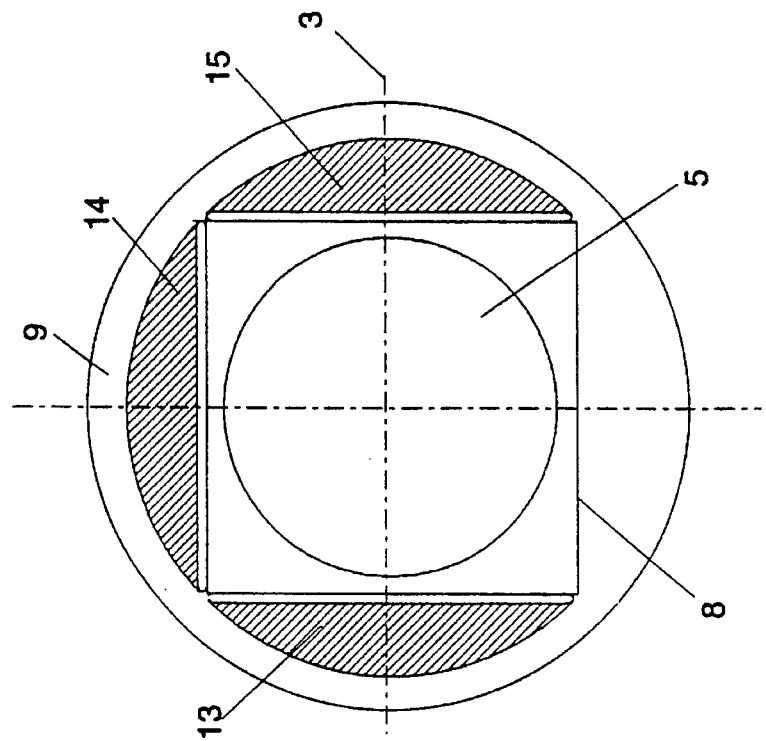
FIG. 3 is a side view in the direction II—II in FIG. 1.

FIG. 3 shows a side view in the direction II—II of FIG. 1 wherein the light entry face 5 and the light exit face 8 are visible as employed outside surfaces of the unit 1,2. The three spherical caps 13,14,15 attached to the unused outside surfaces 12 are also shown in the side view. Beyond this, the spherical caps 13,14 attached to the lateral outside surfaces 12 have the advantage that they improve the strength of the connection between deflection prism 1 and carrier prism 2 since the base areas of the spherical caps 13,14 hold the two prisms 1,2 together with an additional glued connection. The spherical cap 15 attached to the outside surface 12 lying opposite the light exit face 8 further improves the aerodynamic properties of the light beam deflection device.

The spherical caps 13,14,15 can be fabricated, for example, of glass, metal of a light weight, or porous material. Commercially standard optical lenses can also be advantageously employed as spherical caps.

Given employment of three spherical caps 13,14,15, the center of gravity can be brought back onto the optical axis 3 by a slight decentering of the complete light beam deflection device.

Figure 4:
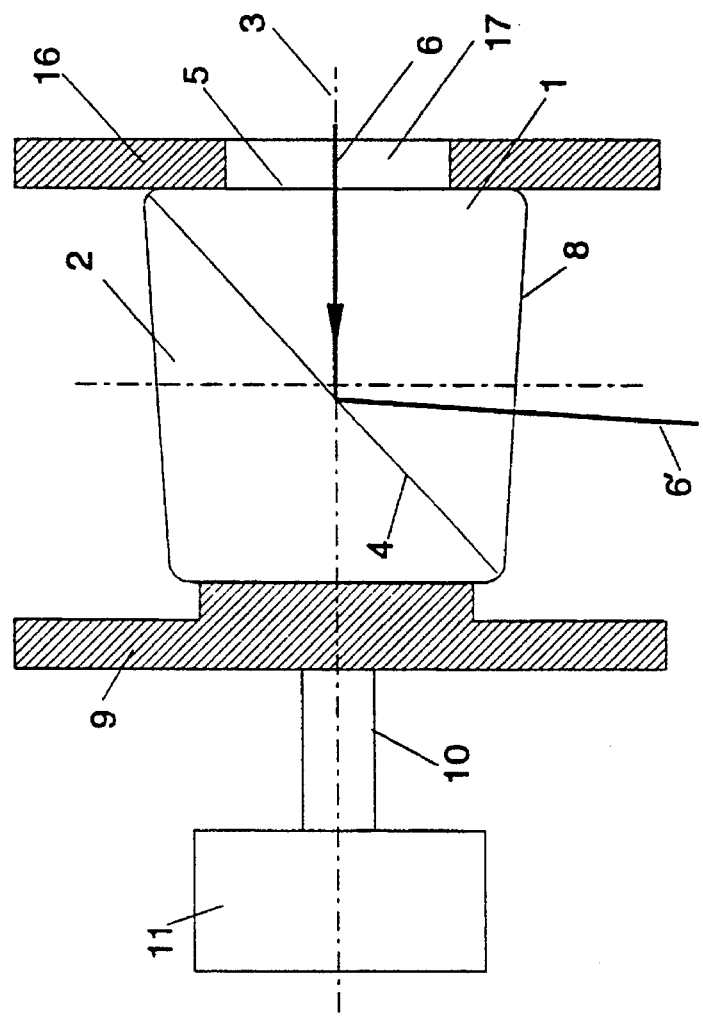
FIG. 4 shows a further development of the light beam deflection device of the invention.

FIG. 4 shows a development of the light beam deflection device of FIG. 1. A disk-shaped or annular cover 16 that extends beyond the unit 1,2 in the radial direction is attached, for example by gluing, to the light entry face 5 of the unit 1,2. The function of a cover at the surface of the unit 1,2 lying opposite the light entry face 5 can be assumed by the receptacle 9 itself, or by a separate disk-shaped or annular cover.

The formation of an air stream in the direction toward the faces charged with light can be further advantageously reduced by the covers. Air streams that potentially occur are diverted and cannot conduct contaminants they convey into the region of the faces provided for the light transport.

The cover 16 attached to the light entry faces can be fabricated of a transparent material, so that the incoming light beam 6 can proceed onto the light entry face 5 through the transparent cover 16. Alternatively, the cover 16 can also comprise a central light entry aperture 17 for the light beam 6.

Figure 5:
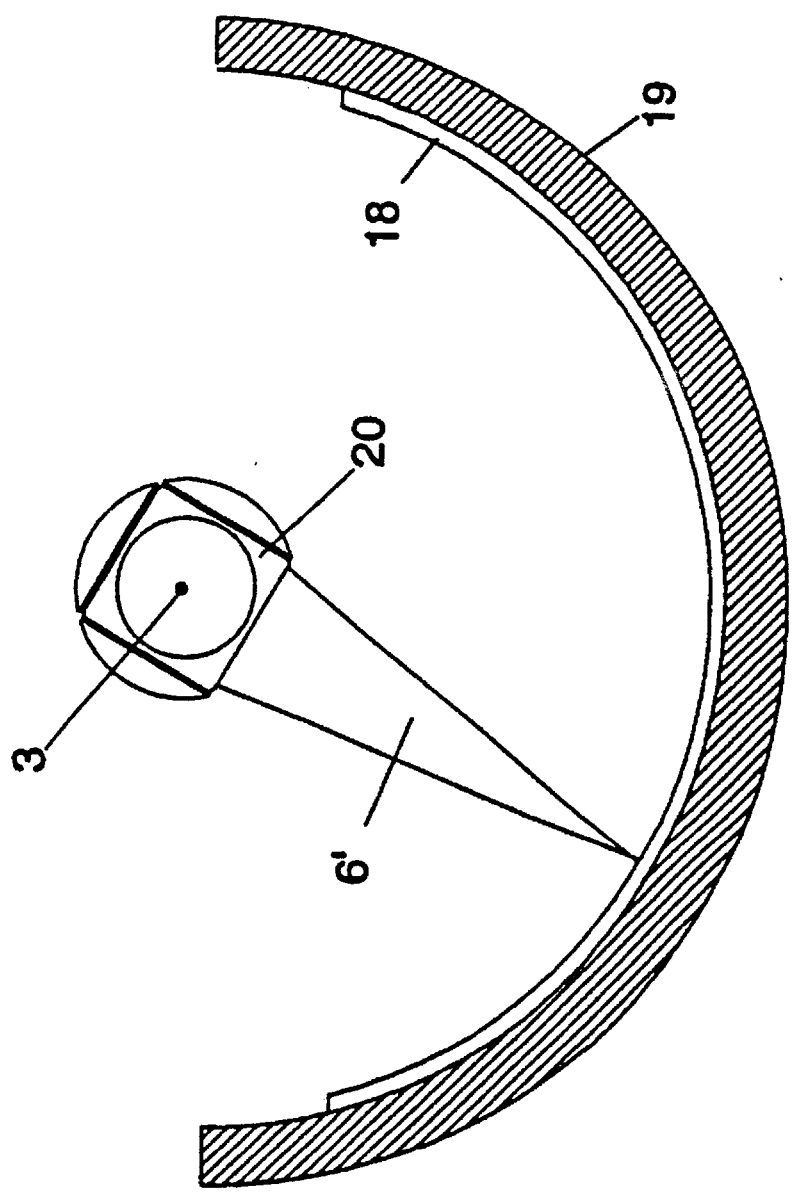
FIG. 5 illustrates an applied example of a light beam deflection device of the invention.

FIG. 5 shows a preferred applied example of a light beam deflection device in a recording device (recorder, exposer) that works according to the inside drum principle. Given such an inside drum recorder or inside drum exposer, a recording material 18 is secured to the inside wall of a holder 19 that is shaped like a half-shell or a cylindrical segment. The light beam deflection device 20 rotates around the optical axis 3 of the holder 19. The light beam 6' is brightness-modulated by an image signal and is steered radially across the recording material 20 with the light beam deflection device 20 for the point-by-point and line-by-line recording of information. For that purpose, the light beam deflection device 20 moves along the optical axis 3 with a drive that is not shown.

The light beam deflection device of the invention can also be advantageously employed in recording apparatus that work according to the flat bed principle.

It lies within the scope of the invention to likewise employ the light beam deflection device in originals scanner apparatus. In this case, the deflected light beam serves the purpose of point-by-point and line-by-line illumination of originals to be scanned.

Although various minor changes and modifications might be proposed by those skilled in the art, it will be understood that I wish to include within the claims of the patent warranted hereon all such changes and modifications as reasonably come within my contribution to the art.

I claim as my invention:

1. A device for deflection of a light beam, comprising:
   a light-permeable deflection prism comprising a light entry face which is perpendicular to a rotational axis, said rotational axis being parallel to an optical axis, a reflection face positioned oblique to the light entry face, and a light exit face on a side of said deflection prism;
   a carrier prism connected to the deflection prism at the reflection face by gluing, the carrier prism supplementing the deflection prism to form a substantially cuboid unit arranged to rotate around said rotational axis, and edges and corners of the cuboid unit which are not used for deflecting the light beam being rounded: and
   spherical caps attached by gluing to at least two outside surfaces of the unit, edges of said reflection face extending to said outside surfaces, said spherical caps supplementing a contour of the unit to form an at least partially spherical outside contour, and each cap being glued to both the deflection prism and the carrier prism at the respective edges of said reflection face.

2. A device according to claim 1 wherein the carrier prism is formed of a light-impermeable material.

3. A device according to claim 2 wherein the light-impermeable material comprises metal.

4. A device according to claim 1 wherein the deflection prism is formed of glass.

5. A device according to claim 1 wherein the deflection prism and the carrier prism are connected to one another by glue.

6. A device according to claim 1 wherein two spherical caps are arranged at outside surfaces of the unit that are formed of faces of both prisms.

7. A device according to claim 6 wherein a further spherical cap is attached to an outside surface of the unit that lies opposite the light exit face.

8. A device according to claim 1 wherein the spherical caps are joined to the outside surfaces of the unit by glue.

9. A device according to claim 1 wherein the outside surface of the unit lying opposite the light entry face is connected to a disk-shaped, rotationally driven receptacle.

10. A device according to claim 1 wherein:
    the reflection face comprises an angle of inclination of substantially 45° relative to the optical axis; and
    the light exit face and the light entry face forming an angle of slightly less than 90° with respect to each other.

11. A device according to claim 1 wherein:
    the reflection face comprises an angle of inclination relative to the optical axis that deviates from 45°; and
    the light exit face is aligned with an inclination deviating from 90° relative to the light entry face such that a light beam coming from the reflection face is perpendicularly incident relative to said light exit face.

12. A device according to claim 11 wherein said outside surfaces of the unit are each inclined for preserving rotational symmetry.

13. A device according to claim 1 wherein the deflection prism and the carrier prism are fabricated of materials having approximately same specific weights.

14. A device according to claim 1 wherein the deflection prism and the carrier prism are fabricated of materials having approximately same coefficients of thermal expansion.

15. A device according to claim 1 wherein the unit comprises at least one disk-shaped cover at the light entry face having a curved outside surface.

16. A device according to claim 15 wherein the cover is formed of a light-permeable material.

17. A device according to claim 15, wherein the cover comprises a central light entry aperture for the light beam.

18. A device for deflection of a light beam, comprising:
    a light-permeable deflection prism comprising a light entry face, a reflection face oblique to the light entry face, and a light exit face approximately perpendicular to the light entry face;
    a carrier prism connected to the deflection prism at the reflection face, the carrier prism supplementing the deflection prism to form a substantially cuboid unit arranged for rotation around an optical axis as a rotational axis which is perpendicular t o the light entry face of the deflection prism, and corners of the unit being rounded;
    spherical caps attached to at least two outside surfaces of the unit, said spherical caps supplementing a contour of the unit to form an outside contour which is spherical in some regions; and
    said spherical caps each being glued to both the deflection prism and the carrier prism along outside edges of said reflection face.

* * * * *